UNITED STATES PATENT OFFICE.

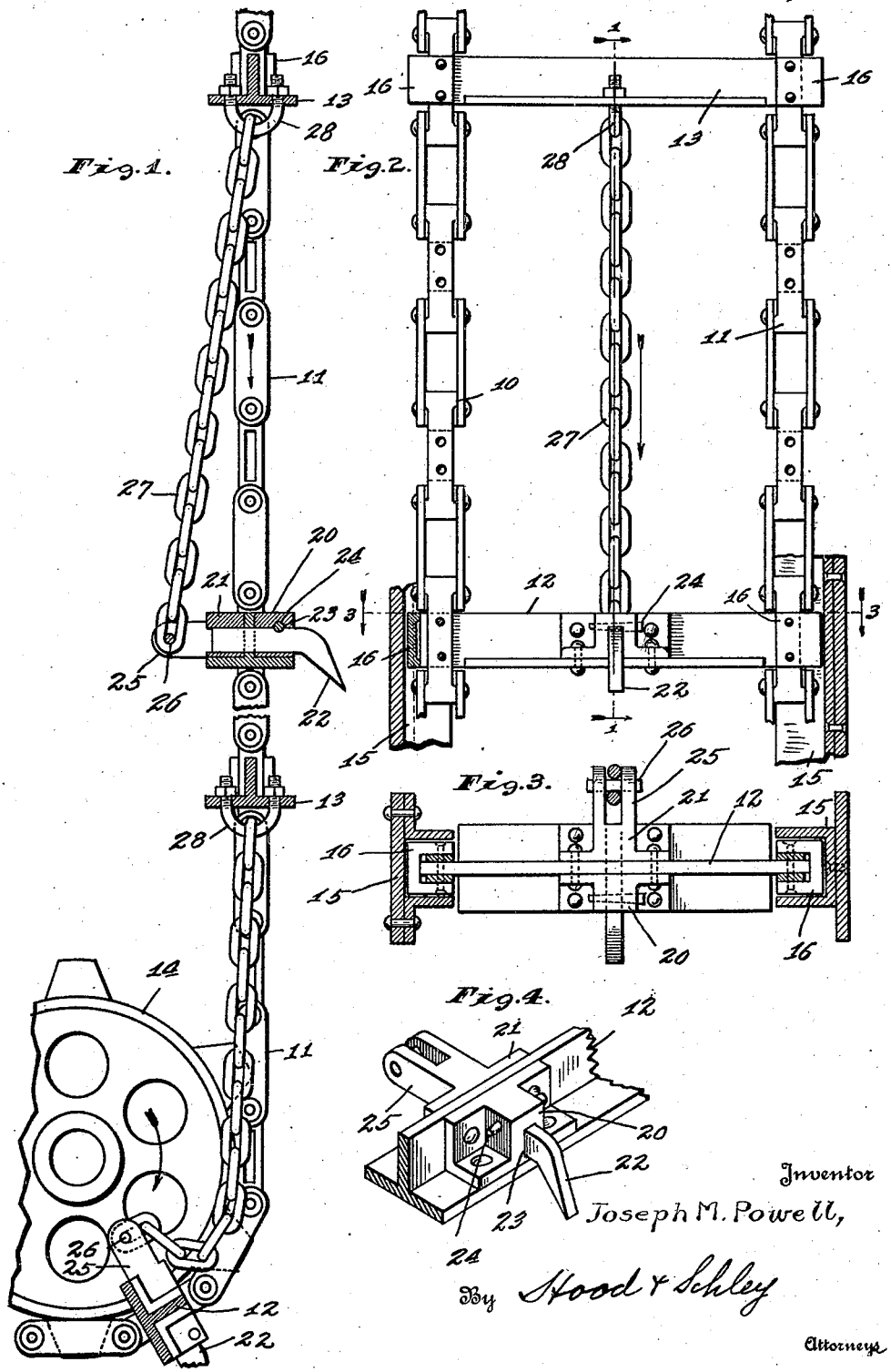

JOSEPH M. POWELL, OF BROOKLYN, INDIANA, ASSIGNOR TO EAGLE IRON WORKS, OF DES MOINES, IOWA, A CORPORATION OF IOWA.

CUTTER FOR SHALE PLANERS.

1,418,463.  Specification of Letters Patent.  Patented June 6, 1922.

Application filed June 22, 1921. Serial No. 479,482.

*To all whom it may concern:*

Be it known that I, JOSEPH M. POWELL, a citizen of the United States, residing at Brooklyn, in the county of Morgan and State of Indiana, have invented a new and useful Cutter for Shale Planers, of which the following is a specification.

My invention relates to cutters for shale planers, with particular reference to the general type of machine shown in my prior Patent No. 1,083,558, granted Jan. 6, 1914.

Heretofore the cross bars which carried the cutters have ordinarily been provided with rearwardly extending arms which co-operated with guides to keep the cutter-carrying bars from being tilted by the reaction of the cutting. This has resulted in a twofold difficulty; first, in producing a transverse pressure on the rear ends of such arms, resulting in great friction between the wearing shoes on such ends and the guides in which they travel, with considerable wear and some loss in power; and second, in interfering with the passage of the chain around its supporting sprockets, as the ends of the arms then project out of the path of the chain, and it was necessary to cut away the guides to allow clearance for them.

It is the object of my present invention to avoid both phases of this difficulty.

In accomplishing this result, I provide the cutter-carrying bar with an arm which projects from the plane of the chain on the opposite side thereof from the edge of the cutter, and I connect this arm by a flexible tension member, such as a short length of chain, with a supplemental transverse bar some distance behind the cutter-carrying bar, so that the tension member is at a slight oblique angle to the plane of the main chain. This both simplifies the passage of the main chain around the sprockets, and reduces the wear on the parts and the power required for operation; while effectively holding the cutters from tilting and permitting the cutters to be radial as they travel around the sprockets.

The accompanying drawing illustrates my invention. Fig. 1 is a vertical central section on the line 1—1 of Fig. 2, through a fragment of a cutter chain having cutters mounted thereon in accordance with my invention, and showing one of the associated sprocket wheels; Fig. 2 is a fragmentary front elevation of such cutter chain; Fig. 3 is a section on the line 3—3 of Fig. 2; and Fig. 4 is a fragmentary perspective view of the middle portion of the cutter-carrying bar with a cutter in place therein.

The cutter chain comprises two parallel chain members 10 and 11, which are cross-connected by cutter-carrying bars 12 and other interspersed cross-bars 13; and the chains 10 and 11 are carried by suitable sprockets 14, and are guided by suitable guide-ways 15, preferably by the cooperation with such guide-ways of shoes 16 mounted on the ends of the cross-bars 12 and 13 and on those links of the chains 10 and 11 to which the cross-bars 12 and 13 are fastened. Both the cross-bars 12 and 13 are conveniently T-irons, with the cross flange cut away where such cross-bars pass through links of the chains 10 and 11; by making these as T-irons, the cross flanges thereof serve as scrapers, to scrape off any projecting portions of shale from the shale bank and to scrape the planed shale through any trough or chute with which the cutter-chain may be associated.

Each cutter-carrying cross-bar 12 is provided with a socket member, which is set in the angle between the stem and one flange of the T of such cross-bar on the side toward the shale bank; and is also provided with a mating member 21 which is seated directly opposite the socket member 20 in the other angle between the stem and the flange of the T. The cutter 22 is received in the socket 23 in the socket member 20, and is held therein by a pin 24; and it may, and preferably does, pass through the stem of the T and into a similar socket in the mating member 21, the stem of the T being perforated to permit such passage of the cutter therethrough. The member 21 is provided with a bifurcated arm 25 which projects some distance out of the plane of the chains 10 and 11 on the opposite side of such plane from the edge of the cutter 22, and a cross pin 26 through the end of such bifurcated arm 25 passes through one end-link of a chain 27, the other end-link of which is attached to a U-bolt 28, which is fastened to the flanges of the T of the cross-bar 13 next behind the aforesaid cross-bar 12. The chain 27 is a flexible tension member taking longitudinal stresses, between the pin 26 and the U-bolt 28.

In operation, when the chains 10 and 14 are moved and the cutters 22 cut shale from the shale bank, the reaction of the shale on the cutters 22 tends to push their cutting edges backward and thus to tilt the cutter-carrying bars 12. This tendency to tilt is effectively resisted by the tension chains 27, which connect the arms 25 to the cross-bars 13 behind. This holds the cutter 22 in proper position. It is found in practice that the transverse component of force tending to offset the cross-bars 13 laterally, out of the plane of the chains 10 and 11, is relatively slight, so that there is relatively little wear on the jaws 16 at the ends of such cross-bars 13, and so relatively little loss of power by reason of the friction of such jaws with the guides 15. When the cutters 22 have reached the bottom of their cut, and their supporting cross-bars 12 come into co-operation with the sprocket 14, the chain links carrying such cross bars turn freely to conform to the sprocket, and the associated tension chains 27 slacken, as is clear from the lower part of Fig. 1, without any parts projecting forward from the plane of the chains 10 and 11, and with the cutters radial with respect to the sprockets, so that the guides 15 may be continued to a point very close to the sprocket 14.

I claim as my invention:

1. A cutter-chain for shale planers, comprising two parallel chains, cross-bars connecting such chains, cutters mounted in some of said cross-bars, the cutter-carrying cross-bars being provided with arms projecting therefrom on the opposite side of the plane of the chains from said cutters, and tension members connecting said arms with cross-bars in the rear of said cutter-carrying cross-bars.

2. A cutter-chain for shale planers, comprising two parallel chains, cross-bars connecting such chains, cutters mounted in some of said cross-bars, and tension members connecting points of said cutter-carrying cross-bars offset from the plane of said chains with other cross-bars longitudinally displaced from said cutter-carrying bars.

3. A cutter-chain for shale planers, comprising two parallel chains, cross-bars connecting such chains, cutters mounted in some of said cross-bars, the cutter-carrying cross-bars being provided with arms projecting therefrom on the opposite side of the plane of the chains from said cutters, tension members connecting said arms with cross-bars in the rear of said cutter-carrying cross-bars, wearing shoes on the ends of said cross-bars, and guides with which such wearing shoes cooperate.

4. A cutter-chain for shale planers, comprising two parallel chains, cross-bars connecting such chains, cutters mounted in some of said cross-bars, and tension members connecting points of said cutter-carrying cross-bars offset from the plane of said chains with other cross-bars longitudinally displaced from said cutter-carrying cross-bars, wearing shoes on the ends of said cross-bars, and guides with which such wearing shoes cooperate.

5. A cutter-chain for shale planers, comprising two parallel chains, a cutter-carrying cross-bar connecting said chains and T-shaped in cross section, members mounted in the angles of the T of said cross-bar and provided with a socket, a cutter mounted in said socket, the other of said members than that from which said cutter projects being provided with an arm projecting from the plane of said chains, a second cross-bar connecting said chains and displaced longitudinally thereof from said cutter-carrying cross-bar, and a tension chain connecting said arm with said second cross-bar.

6. A cutter-chain for shale planers, comprising two parallel chains, cross-bars connecting such chains, cutters mounted in some of said cross-bars, and longitudinal-stress-taking members connecting points of said cutter-carrying cross-bars offset from the plane of said chains with other cross-bars longitudinally displaced from said cutter-carrying cross-bars.

7. A cutter-chain for shale planers, comprising two parallel chains, cross-bars connecting such chains, cutters mounted in some of said cross-bars, longitudinal-stress-taking members connecting points of said cutter-carrying cross-bars offset from the plane of said chains with other cross-bars longitudinally displaced from said cutter-carrying cross-bars, wearing shoes on the ends of said cross-bars, and guides with which such wearing shoes cooperate.

8. A cutter-chain for shale planers, comprising two parallel chains, cross-bars shaped to constitute scrapers and cross-connecting such chains, cutters mounted in some of such cross-bars, and tension members connecting points of said cutter-carrying cross-bars offset from the plane of said chains with other cross-bars longitudinally displaced from said cutter-carrying cross-bars.

9. A cutter-chain for shale planers, comprising two parallel chains, cross-bars connecting such chains, such cross-bars being T-shaped in cross-section, cutters mounted in some of said cross-bars, and tension members connecting points of said cutter-carrying cross-bars offset from the plane of said chains with other cross-bars longitudinally displaced from said cutter-carrying cross-bars.

In witness whereof, I have hereunto set my hand at Indianapolis, Indiana, this first day of June, A. D. one thousand nine hundred and twenty one.

JOSEPH M. POWELL.